(12) United States Patent
Hou

(10) Patent No.: US 9,119,112 B1
(45) Date of Patent: Aug. 25, 2015

(54) MANAGING INITIAL CELL SELECTION IN A WIRELESS COMMUNICATION NETWORK

(71) Applicant: Sprint Spectrum LP, Overland Park, KS (US)

(72) Inventor: Pei Hou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/051,335

(22) Filed: Oct. 10, 2013

(51) Int. Cl.
*H04W 28/08* (2009.01)
*H04W 36/00* (2009.01)

(52) U.S. Cl.
CPC ................................ *H04W 36/0011* (2013.01)

(58) Field of Classification Search
CPC ....... H04W 36/08; H04W 4/06; H04W 48/02; H04W 48/08; H04W 64/00; H04W 48/12
See application file for complete search history.

(56) References Cited

U.S. PATENT DOCUMENTS

| 7,277,709 | B2 | 10/2007 | Vadgama |
| 7,310,526 | B2 | 12/2007 | Sang et al. |
| 7,430,193 | B2 | 9/2008 | Kim et al. |
| 2005/0176440 | A1* | 8/2005 | Sang et al. ............ 455/453 |
| 2009/0129327 | A1* | 5/2009 | Horn et al. ............ 370/329 |
| 2010/0311349 | A1* | 12/2010 | Koo et al. ............ 455/67.11 |
| 2011/0053598 | A1 | 3/2011 | Ahluwalia |

* cited by examiner

*Primary Examiner* — Quan M Hua

(57) ABSTRACT

Synchronization information and access node identification information are transmitted from a first access node and a second access node. It is determined that loading information of the first access node meets a first loading criteria and loading information of the second access node meets a second loading criteria. A message is transmitted from the first access node comprising the determination that the loading information of the first access node meets the first loading criteria and the loading information of the second access node meets the second loading criteria. The wireless device then determines the second access node identification based on the message and on the synchronization information. An access request is received at the second access node to initiate a communication session between a wireless device and the second access node.

20 Claims, 7 Drawing Sheets

MANAGING INITIAL CELL SELECTION IN A WIRELESS COMMUNICATION NETWORK

TECHNICAL BACKGROUND

Prior to establishing communication with a communication network, a wireless device identifies an access node and attempts to initiate communication with the access node. Where the wireless device can detect more than one access node, typically the wireless device identifies and selects the access node with the strongest signal level. Lacking any further information about the selected access node, the wireless device can send a request to initiate communication with the access node. When the selected access node is heavily loaded, the access node may reject the initial communication request, forcing the wireless device to identify another access node and attempt to initiate communication with the next access node. This can cause delay in establishing network communication, and can also waste battery power of the wireless device.

OVERVIEW

In operation, synchronization information and access node identification information from a first access node and a second access node are received at a wireless device. A message from the first access node comprising loading information of the first access node and of the second access node is also received at the wireless device. It is determined at the wireless device that the first access node comprises a highest cross-correlation and that the second access node comprises a next highest cross-correlation based on the synchronization information and the access node identification. It is also determined at the wireless device that the loading information of the first access node meets a first loading criteria and that the loading information of the second access node meets a second loading criteria. When the loading information of the first access node meets a first loading criteria and the loading information of the second access node meets a second loading criteria, the wireless device sends to the second access node a request to initiate a communication session between the wireless device and the second access node.

DETAILED DESCRIPTION

Figure 1:
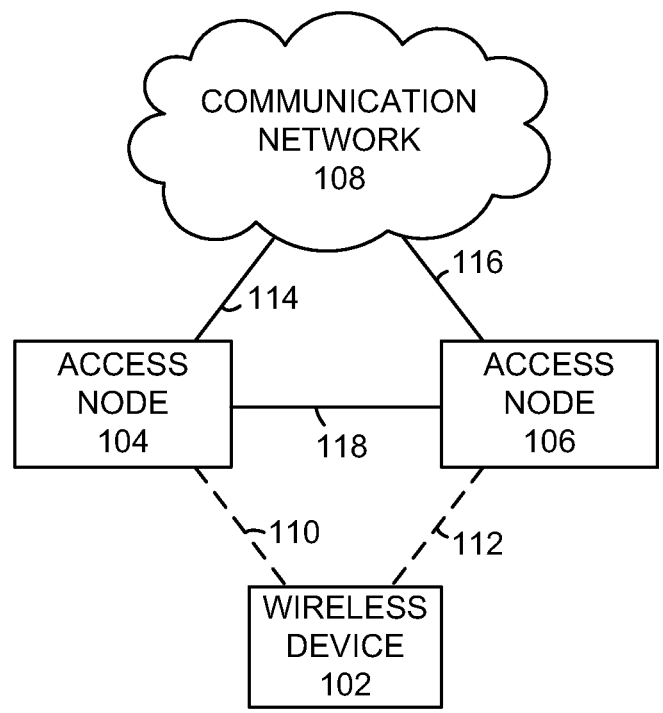
FIG. 1 illustrates an exemplary communication system to manage initial cell selection in a wireless communication network.

FIG. 1 illustrates an exemplary communication system 100 to manage initial cell selection in a wireless communication network comprising wireless device 102, access node 104, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110 and with access node 106 over communication link 106.

Access nodes 104 and 106 are each a network node capable of providing wireless communications to wireless device 102, and can be, for example, a base transceiver station, a radio base station, an eNodeB device, or an enhanced eNodeB device. Access node 104 is in communication with communication network 108 over communication link 114, and access node 106 is in communication with communication network 108 over communication link 116.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116 and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Prior to establishing communication with a communication network, a wireless device identifies an access node and attempts to initiate communication with the access node. For example, when the wireless device powers on, the wireless device can scan available frequency bands in search of a signal from an access node. A wireless device may detect more than one access node, and typically the wireless device identifies the access node with the strongest signal level. However, in the typical case, the wireless device has no further information about the detected access nodes, such as information about the current loading of wireless communication links to the access nodes. When the wireless device sends a request to initiate communication with the access node having the strongest signal level, if the access node is heavily loaded it may reject the initial communication request. When the initial communication request is rejected, the wireless device is forced to identify another access node and attempt to initiate communication with the next access node. This can cause delay in establishing network communication, and can also waste battery power of the wireless device.

In operation, wireless device 102 receives synchronization information and access node identification information from first access node 104 and second access node 106. A message from first access node 104 comprising loading information of first access node 104 and of second access node 106 is also received at wireless device 102. For example, wireless device 102 may power on, and before communication is established with an access node wireless device 102 can receive synchronization information and access node identification information from first access node 104 and second access node 106. In an embodiment, wireless device 102 can determine that first access node 104 comprises a highest cross-correlation between a received synchronization sequence and a local sequence of the wireless device, and that second access node 106 comprises a next highest cross-correlation between the received synchronization sequence and the local sequence of the wireless device based on the synchronization information and the access node identification. The wireless device can also determine that the loading information of first access node 104 meets a first loading criteria, and that the loading information of second access node 106 meets a second loading criteria. When the loading information of first access node 104 meets a first loading criteria and the loading information of second access node 106 meets a second loading criteria, wireless device 102 sends a request to initiate a communication session to second access node 106 to initiate communication between wireless device 102 and second access node 106.

Figure 2:
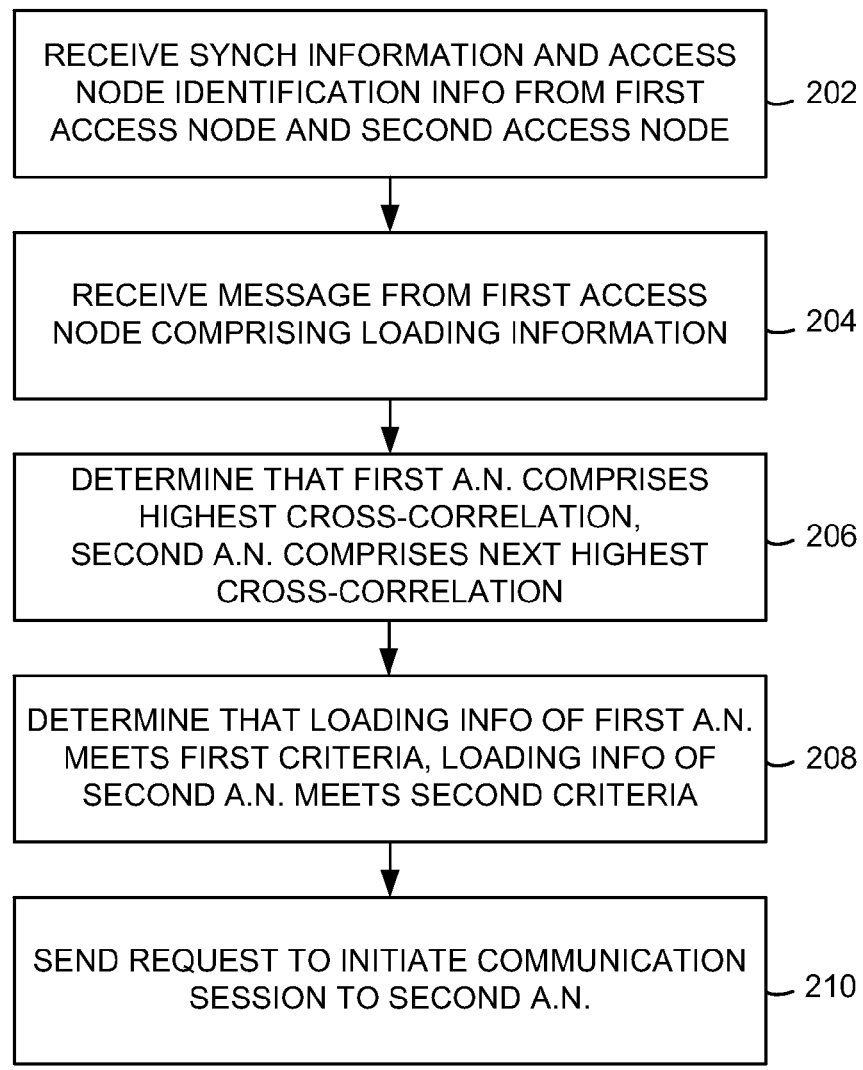
FIG. 2 illustrates an exemplary method of managing initial cell selection in a wireless communication network.
Figure 3:
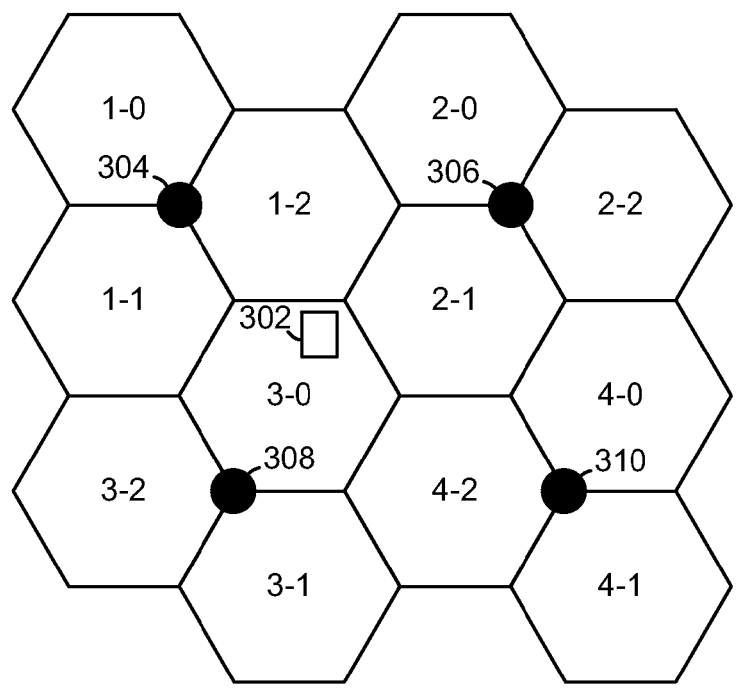
FIG. 3 illustrates exemplary access nodes and sectors of the access nodes.

FIG. 2 illustrates an exemplary method of managing initial cell selection in a wireless communication network. In operation 202, synchronization information and access node identification information are received at a wireless device from a first access node and a second access node. For example, when a wireless device is powered up, it is not in communication with a communication system and it begins to perform initial cell selection, such as by scanning available or detected frequency bands. As one example, FIG. 3 illustrates wireless device 302 and access nodes 304, 306, 308 and 310. Assuming that wireless device 302 is in a coverage area of each access node, wireless device 302 can receive synchronization information and access node identification information from access nodes 304, 306, 308 and 310. Access node identification information can comprise a unique identifier for each detected access node. The access node identification information can also comprise unique sector identification information for each sector of each detected access node, as well as cell group identification information. The synchronization information can comprise information received over synchronization signals provided by each detected access node, for example, a synchronization channel. In an embodiment, an access node can provide a primary synchronization channel (P-SCH) and a secondary synchronization channel (S-SCH), wherein the P-SCH comprises time and frequency synchronization information to enable the demodulation of the S-SCH, and wherein the S-SCH comprises access node-specific reference signal information and frame timing information.

Returning to FIG. 2, a message is also received at the wireless device from the first access node comprising loading information of the first access node and the second access node (operation 204). For example, wireless device 302 can receive loading information of the closest access nodes 304 and 308, as well as of access nodes 306 and 310. The message comprising the loading information is provided by access node 304 prior to the establishment of a communication session between access node 304 and wireless device 302. As such, the message can be provided in a broadcast message, rather than in a message addressed specifically to wireless device 302. The access nodes can provide loading information to each other over a communication link (for example, communication link 118 illustrated in FIG. 1). In an embodiment, each of access nodes 304, 306, 308 and 310 comprise a neighbor list of other access nodes, and each of access nodes 304, 306, 308 and 310 can transmit their own loading information as well as loading information of each access node on the neighbor list in the message.

Next, the wireless device determines that the first access node comprises a highest cross-correlation and that the second access node comprises a next highest cross-correlation based on the synchronization information and the access node identification (operation 206). The cross-correlations can be computed using the access node identification information as well as synchronization information in the primary synchronization channel and the secondary synchronization channel. In an embodiment, the access node identification information can be used to extract a reference sequence from sub-carriers of the synchronization information from access nodes 304 and 306, and the reference sequence can be used to determine the cross-correlation for the first access node and the second access node. Based on the cross-correlations, the wireless device can determine that the first access node comprises a highest cross-correlation and that the second access node comprises a next highest cross-correlation.

It is determined at the wireless device that the loading information of the first access node meets a first loading criteria and that the loading information of the second access node meets a second loading criteria (operation 208). When a wireless device sends a request to initiate communication with an access node based only on the strongest signal level, a heavily loaded access node may reject the initial communication request, causing delay in establishing network communication and wasting battery power of the wireless device. The wireless device can use the loading information of the first and second access nodes in the selection of an access node which will avoid such delay. The first loading criteria can be met when the loading information of the first access node is greater than or equal to a threshold loading level. The threshold loading level can be a loading of an access node which will lead to the rejection of a request to initiate communication by the access node. The second loading criteria can be met when the loading information of the access node is less than a threshold loading level, such that a request to initiate communication from the wireless device will not be rejected by the access node.

In operation 210, the wireless device then sends to the second access node a request to initiate a communication session between the wireless device and the second access node. The second access node is selected at least in part because the loading information of the first access node meets the first loading criteria, and because the second access node comprises the next highest cross-correlation. Further, the loading information of the second access node meets a second loading criteria.

Figure 4:
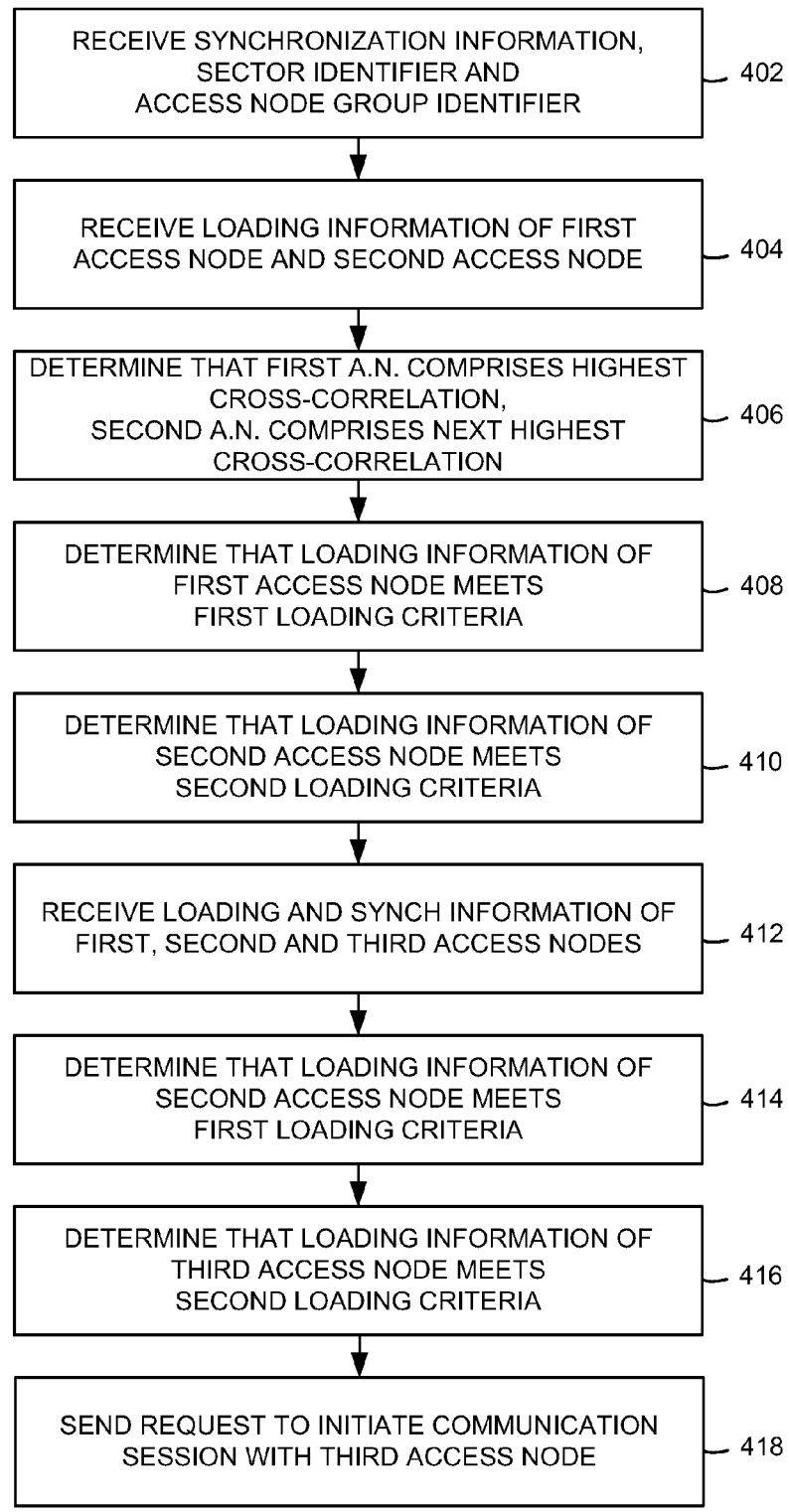
FIG. 4 illustrates another exemplary method of managing initial cell selection in a wireless communication network.

FIG. 4 illustrates another exemplary method of managing initial cell selection operation at a wireless device in a wireless communication network. In operation 402, synchronization information and access node identification information are received at a wireless device from a first access node and a second access node. For example, referring to FIG. 3, when wireless device 302 is powered up it is not in communication with a communication system and begins to perform initial cell selection, for example, by scanning available or detected frequency bands, and wireless device 302 can receive synchronization information and access node identification information from access nodes 304-310. Access node identification information can comprise a unique identifier for each detected access node. The access node identification information can also comprise unique sector identification information for each sector of each detected access node, as well as cell group identification information. The synchronization information can comprise information received over synchronization signals provided by each detected access node, for example, a synchronization channel. In an embodiment, an access node can provide a primary synchronization channel (P-SCH) and a secondary synchronization channel (S-SCH), wherein the P-SCH comprises time and frequency synchronization information to enable the demodulation of the S-SCH, and wherein the S-SCH comprises access node-specific reference signal information and frame timing information.

In an embodiment, the access node identification information further comprises an access node sector identifier and an access node group identifier which is based on the access node sector identifier. For example, referring to FIG. 3, access node identification information from access node 308 can comprise sector identifier 3-0, indicating that wireless device 302 is receiving a signal from access node 308 in the identified sector. Similarly, access node identification information from access node 304 can comprise sector identifier 1-2, indicating that wireless device 302 is receiving a signal from access node 304 in the identified sector. Further, the access node group identifier can comprise an identifier common to each sector of an access node. For example, each sector of access node 304 can comprise the access node group identifier 1 (common to sectors 1-0, 1-1, and 1-2). Similarly, an access node group identifier for access node 308 can be 3 (common to sectors 3-0, 3-1 and 3-2).

Moreover, a physical access node identifier can be determined based on the access node sector identifier and the access node group identifier. A physical access node identifier comprises a unique identifier of an access node. In an embodiment, the physical access node identifier can be determined as a function of the access node sector identifier and the access node group identifier. One example of such a function is [physical AN identifier=3(AN sector identifier)+AN group identifier]. Other functions are also possible to provide a unique physical access node identifier.

Returning to FIG. 4, a message is also received at the wireless device from the first access node comprising loading information of the first access node and the second access node (operation 404). For example, wireless device 302 can receive loading information of access nodes 304-310. The message comprising the loading information is provided by access node 304 prior to the establishment of a communication session between access node 304 and wireless device 302, and can be provided in a broadcast message rather than in a message addressed specifically to wireless device 302. Access nodes 304-310 can provide loading information to each other over a communication link between the two access nodes. In an embodiment, each of access nodes 304, 306, 308 and 310 comprise a neighbor list of other access nodes, and each of access nodes 304, 306, 308 and 310 can transmit their own loading information as well as loading information of each access node on the neighbor list in the message.

The wireless device then determines that the first access node comprises a highest cross-correlation and that the second access node comprises a next highest cross-correlation based on the synchronization information and the access node identification (operation 406). The access node identification information and synchronization information in the primary synchronization channel and the secondary synchronization channel can be used to determine the cross-correlations. In an embodiment, the access node identification information can be used to extract a reference sequence from sub-carriers of the synchronization information from access nodes 304-310, and the reference sequence can be used to determine the cross-correlation for the first access node and the second access node. Based on the cross-correlations, the wireless device can determine that the first access node comprises a highest cross-correlation and that the second access node comprises a next highest cross-correlation.

Next, it is determined at the wireless device that the loading information of the first access node meets a first loading criteria (operation 408) and that the loading information of the second access node meets a second loading criteria (operation 410). The wireless device can use the loading information of the first and second access nodes in the selection of an access node to avoid delay from the rejection of an initial communication request by the first access node. The first loading criteria can be met when the loading information of the first access node is greater than or equal to a threshold loading level. The threshold loading level can be a loading of an access node which will lead to the rejection of a request to initiate communication by the access node. The second loading criteria can be met when the loading information of the an access node is less than a threshold loading level, such that a request to initiate communication from the wireless device will not be rejected by the access node. In an embodiment, it can be identified based on the physical access node identifier that the message comprises loading information of the first access node. Further, it can be determined based on the identification that the loading information of the first access node meets the first loading criteria.

A wireless device may not immediately send a request to initiate a communication session with an access node. Further, because of wireless device mobility, network and wireless environment conditions may have changed such that the synchronization information and the loading information may no longer be accurate. Moreover, information of an additional access node may be available. Accordingly, the message described above may be synchronization information and loading information may be received at the wireless device at a first time, and further, in operation 412, additional loading and synchronization information may be received at a second time at the wireless device from the first and second access nodes (e.g., access nodes 304 and 308) as well as from a third access node (e.g., access node 306 or 310). Because conditions have changed, it can be determined at (or after the second time that the loading information of the second access node meets the first loading criteria (operation 414) and that loading information of the third access node meets the second loading criteria (operation 416). In other words, at the second time it can be determined that the second access node is loaded such that the second access node would reject an initial access request from the wireless device, and further, that the third access node is not loaded to a level where an initial access request from the wireless device would be rejected. In addition, a new cross-correlation can be determined for the first, second and third access nodes.

In operation 418, the wireless device then sends to the third access node a request to initiate a communication session between the wireless device and the third access node. The third access node is selected at least in part because (at or after the second time) the loading information of the first access node and the second access node meets the first loading criteria, and because the loading information of the third access node meets a second loading criteria. The selection of the third access node can also be consistent with a cross-correlation of the third access node. For example, the third access node can comprise a third highest cross-correlation, or after the second time the third access node can comprise a next highest cross-correlation after a highest cross-correlation of one of access nodes 304 and 308.

Figure 5:
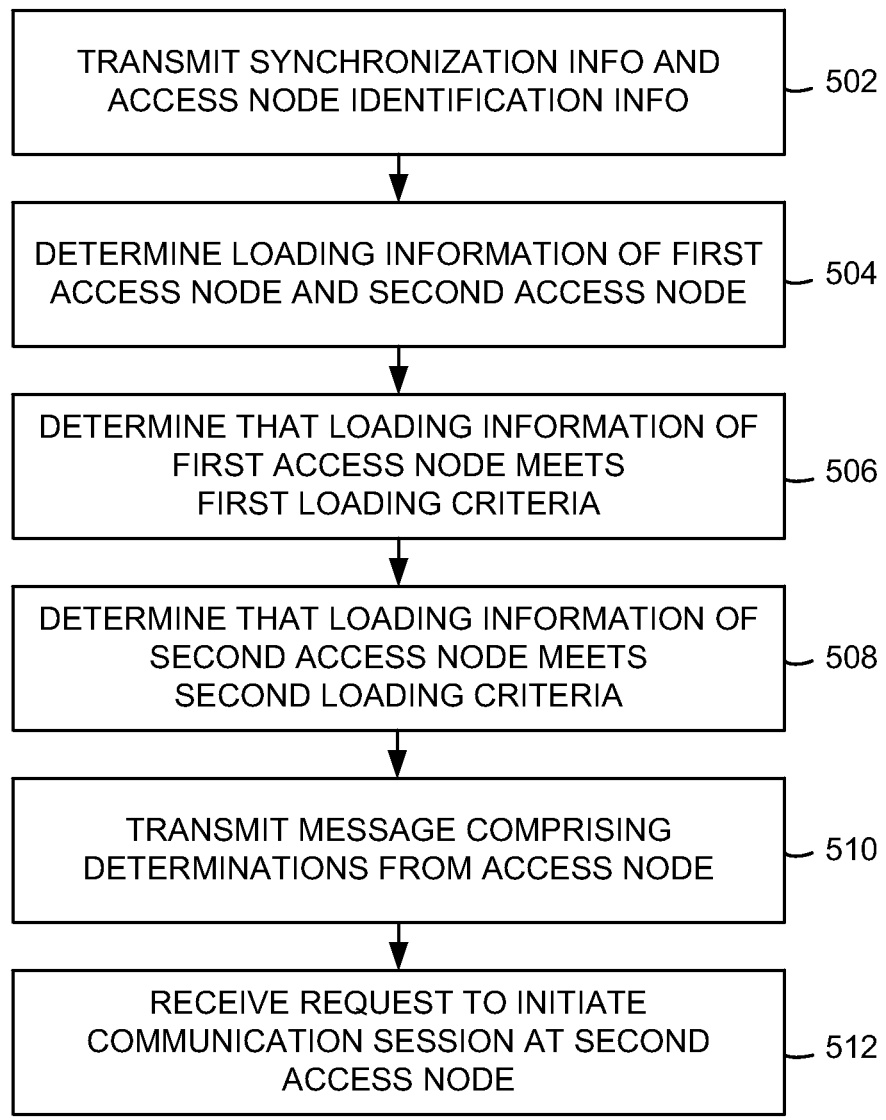
FIG. 5 illustrates another exemplary method of managing initial cell selection in a wireless communication network.

FIG. 5 illustrates another exemplary method of managing initial cell selection operation at a wireless device in a wireless communication network. In operation 502, synchronization information and access node identification information are transmitted from a first access node and a second access node. The synchronization information and access node identification information can be transmitted from first access node 304 and second access node 308 and received at wireless device 302. Synchronization information and access node identification information can also be transmitted from access nodes 306 and 310.

In operation 504, loading information of the first access node and the second access node is determined. Access nodes 304 and 308 can provide loading information to each other over a communication link (for example, communication link 118 illustrated in FIG. 1). In an embodiment, each of access nodes 304, 306, 308 and 310 comprise a neighbor list of other access nodes, and each of access nodes 304, 306, 308 and 310 can transmit their own loading information as well as loading information of each access node on the neighbor list in the message.

Further, it is determined that loading information of the first access node meets a first loading criteria (operation 506) and that loading information of the second access node meets a second loading criteria (operation 508). The determinations can be made at access node 304-310, or at another network element of a communication system, such as a controller node, a gateway node, and the like. The loading information of the first and second access nodes can be used in the selection of an access node which will avoid delay due to the rejection of an initial communication request from an access node. The first loading criteria can be met when the loading information of the first access node is greater than or equal to a threshold loading level. The threshold loading level can be a loading of an access node which will lead to the rejection of a request to initiate communication by the access node. The second loading criteria can be met when the loading information of the an access node is less than a threshold loading level, such that a request to initiate communication from the wireless device will not be rejected by the access node.

In operation 510, the determinations of loading information, as well as that the loading information of the first access node meets a first loading criteria and that the loading information of the second access node meets a second loading criteria are transmitted in a message. The message can be provided in a broadcast message, rather than in a message addressed specifically to wireless device 302. For example, the message can be provided by access node 304 prior to the establishment of a communication session between access node 304 and wireless device 302. In an embodiment, the message can comprise a system information block (SIB) message, such as a master information block (MIB), message, a SIB1 message, a SIB2 message, and the like.

In operation 512, a request to initiate a communication session is received at the second access node to request a communication session between the wireless device and the second access node. The second access node is selected at least in part because the loading information of the first access node meets the first loading criteria. The second access node is also selected because based on the message, the synchronization information, and the access node identification information, it can be determined that the first access node comprises a highest cross-correlation and that the second access node comprises a next-highest cross-correlation. In an embodiment, wireless device 302 can make the determinations that that the first access node comprises a highest cross-correlation and that the second access node comprises a next-highest cross-correlation.

Figure 6:
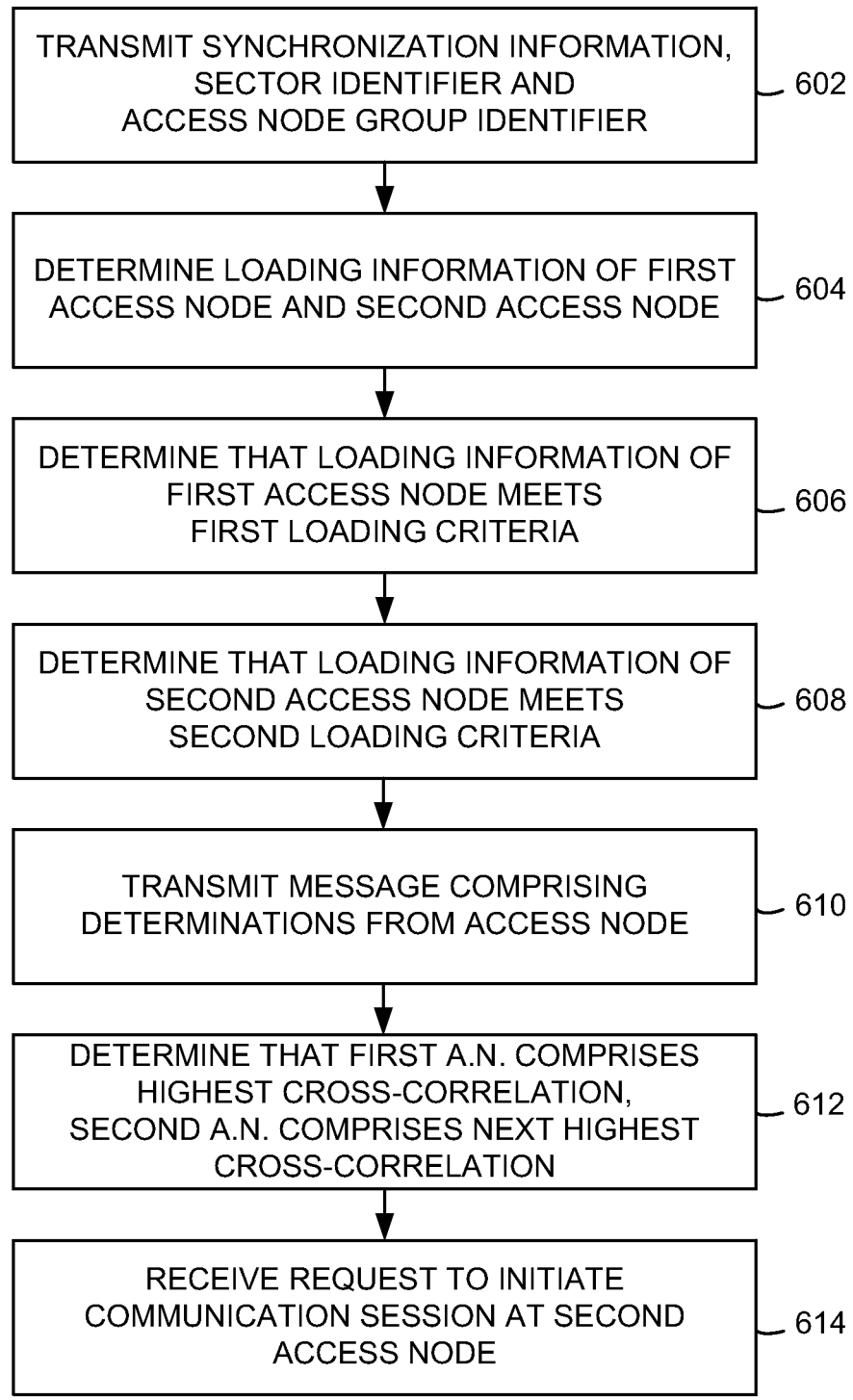
FIG. 6 illustrates another exemplary method of managing initial cell selection in a wireless communication network.

FIG. 6 illustrates another exemplary method of managing initial cell selection in a wireless communication network, from the perspectives of an access node and a wireless device. Synchronization information and access node identification information are transmitted from a first access node and a second access node (operation 602). The synchronization information and access node identification information can be transmitted from first access node 304 and second access node 308 and received at wireless device 302. Synchronization information and access node identification information can also be transmitted from access nodes 306 and 310.

In an embodiment, the access node identification information further comprises an access node sector identifier and an access node group identifier which is based on the access node sector identifier. For example, access node identification information from access node 308 can comprise sector identifier 3-0, indicating that wireless device 302 is receiving a signal from access node 308 in the identified sector. Similarly, access node identification information from access node 304 can comprise sector identifier 1-2, indicating that wireless device 302 is receiving a signal from access node 304 in the identified sector. Further, the access node group identifier can comprise an identifier common to each sector of an access node. For example, each sector of access node 304 can comprise the access node group identifier 1 (common to sectors 1-0, 1-1, and 1-2). Similarly, an access node group identifier for access node 308 can be 3 (common to sectors 3-0, 3-1 and 3-2).

Moreover, a physical access node identifier can be determined based on the access node sector identifier and the access node group identifier. A physical access node identifier comprises a unique identifier of an access node. In an embodiment, the physical access node identifier can be determined as a function of the access node sector identifier and the access node group identifier. One example of such a function is [physical AN identifier=3(AN sector identifier)+AN group identifier]. Other functions are also possible to provide a unique physical access node identifier.

In operation 604, loading information of the first access node and the second access node is determined. Access nodes 304-310 can provide loading information to each other over a communication link (for example, communication link 118 illustrated in FIG. 1). In an embodiment, each of access nodes 304, 306, 308 and 310 comprise a neighbor list of other access nodes, and each of access nodes 304, 306, 308 and 310 can transmit their own loading information as well as loading information of each access node on the neighbor list in the message.

It is determined that loading information of the first access node meets a first loading criteria (operation 606) and that loading information of the second access node meets a second loading criteria (operation 608). The determinations can be made at access node 304-310, or at another network element of a communication system, such as a controller node, a gateway node, and the like. The loading information of the first and second access nodes can be used in the selection of an access node which will avoid delay due to the rejection of an initial communication request from an access node. The first loading criteria can be met when the loading information of the first access node is greater than or equal to a threshold loading level. The threshold loading level can be a loading of an access node which will lead to the rejection of a request to initiate communication by the access node. The second loading criteria can be met when the loading information of the an access node is less than a threshold loading level, such that a request to initiate communication from the wireless device will not be rejected by the access node.

In operation 610, the determinations of loading information, as well as that the loading information of the first access node meets a first loading criteria and that the loading information of the second access node meets a second loading criteria is transmitted in a message. The message can be provided in a broadcast message, rather than in a message addressed specifically to wireless device 302. For example, the message can be provided by access node 304 prior to the establishment of a communication session between access node 304 and wireless device 302. In an embodiment, the message can comprise a system information block (SIB) message, such as a master information block (MIB), message, a SIB1 message, a SIB2 message, and the like.

It can be determined that the first access node comprises a highest cross-correlation and that the second access node comprises a next highest cross-correlation based on the synchronization information and the access node identification (operation 612). For example, wireless device 302 can use the access node identification information and synchronization information in the primary synchronization channel and the secondary synchronization channel to determine the cross-correlations. In an embodiment, the access node identification information can be used to extract a reference sequence from sub-carriers of the synchronization information from access nodes 304 and 308, and the reference sequence can be used to determine the cross-correlation for the first access node and the second access node. Based on the cross-correlations, the wireless device can determine that the first access node comprises a highest cross-correlation and that the second access node comprises a next highest cross-correlation.

In operation 614, a request to initiate a communication session is received at the second access node to request a communication session between the wireless device and the second access node. The second access node is selected at least in part because the loading information of the first access node meets the first loading criteria. The second access node is also selected because based on the message, the synchronization information, and the access node identification information, it can be determined that the first access node comprises a highest cross-correlation and that the second access node comprises a next-highest cross-correlation. In an embodiment, wireless device 302 can make the determinations that that the first access node comprises a highest cross-correlation and that the second access node comprises a next-highest cross-correlation. Accordingly, wireless device 302 can avoid delay in establishing network communication where an initial communication request is rejected by a first access node, and in which wireless device 302 is then forced to identify another access node and attempt to initiate communication with the next access node.

Figure 7:
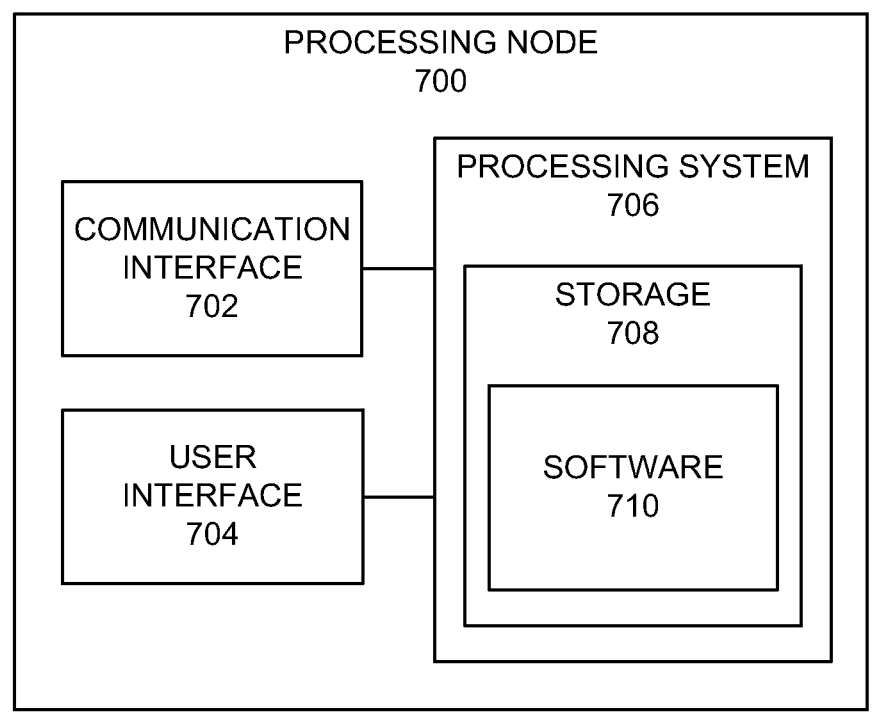
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to manage initial cell selection in a wireless communication network. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 106, 304, 306, 308 and 310. Processing node 700 can also be an adjunct or component of a network element, such as an element of access nodes 104, 106, 304, 306, 308 and 310. Processing node 700 can also be another network element in a communication system, such as a gateway node or a controller node. Examples of a gateway node comprise an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), and authentication, authorization, and accounting (AAA) equipment. Examples of a controller node comprise a mobile switching center (MSC), a dispatch call controller (DCC), a mobility management entity (MME), and other similar network elements. The functionality of processing node 700 can also be distributed over two or more network elements in a communication network.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing initial cell selection in a wireless communication network, comprising:
   receiving at a wireless device synchronization information and access node identification information from a first access node and a second access node;
   receiving at the wireless device a message from the first access node comprising loading information of the first access node and of the second access node;
   determining at the wireless device that the first access node comprises a highest cross-correlation and that the second access node comprises a next highest cross-correlation based on the synchronization information and the access node identification, wherein the access node identification for each of the first access node and second access node is used to extract references sequences from the synchronization information such that the highest cross-correlation and next highest cross-correlation are determined based on the extracted references sequences;
   determining at the wireless device that the loading information of the first access node meets a first loading criteria and that the loading information of the second access node meets a second loading criteria; and
   sending from the wireless device to the second access node a request to initiate a communication session between the wireless device and the second access node based on the determined cross-correlations and the determinations that the loading information of the first access node meets the first loading criteria and that the loading information of the second access node meets the second loading criteria.

2. The method of claim 1, wherein the access node identification information further comprises an access node sector identifier and an access node group identifier which is based on the access node sector identifier.

3. The method of claim 2, further comprising determining at the wireless device a physical access node identifier based on the access node sector identifier and the access node group identifier.

4. The method of claim 3, further comprising:
   identifying based on the physical access node identifier that the message comprises loading information of the first access node; and
   determining based on the identification that the loading information of the first access node meets the first loading criteria.

5. The method of claim 1, further comprising receiving at the wireless device at a first time a message from the access node comprising loading information of the first access node and of the second access node.

6. The method of claim 5, further comprising:
   receiving at a second time at the wireless device an updated message comprising updated loading information of the second access node and loading information of a third access node;
   determining at the wireless device that the loading information of the second access node meets the first loading criteria and that loading information of the third access node meets the second loading criteria; and
   sending from the wireless device to the second access node a request to initiate a communication session between the wireless device and the third access node.

7. A method of managing initial cell selection in a wireless communication network, comprising:
   transmitting synchronization information and access node identification information from a first access node and a second access node;
   determining that loading information of the first access node meets a first loading criteria and loading information of the second access node meets a second loading criteria;
   transmitting a message from the first access node comprising the determination that the loading information of the first access node meets the first loading criteria and the loading information of the second access node meets the second loading criteria; and
   receiving at the second access node an access request to initiate a communication session between a wireless device and the second access node based on the message and a determination that the first access node comprises a highest cross-correlation and that the second access node comprises a next-highest cross-correlation, wherein the access node identification for each of the first access node and second access node is used to extract references sequences from the synchronization information such that the highest cross-correlation and next highest cross-correlation are determined based on the extracted references sequences.

8. The method of claim 7, further comprising transmitting a message from the first access node prior to the receipt of an access request from a wireless device comprising the determination that the loading information of the first access node meets the first loading criteria and the loading information of the second access node meets the second loading criteria, wherein the loading information of the second access node is shared with first access node.

9. The method of claim 7, further comprising determining at a first time that the loading information of the first access node meets a first loading criteria and the loading information of the second access node meets a second loading criteria.

10. The method of claim 9, further comprising:
    determining at a second time that the loading information of the second access node meets the first loading criteria and that loading information of a third access node meets the second loading criteria;
    updating the message to include the determination that the loading information of the second access node meets the first loading criteria and that the loading information of a third access node meets the second criteria; and transmitting the updated message from at least one of the first access node, the second access node and the third access node.

11. The method of claim 7, wherein the message comprises a system information block message.

12. The method of claim 7, wherein the loading information of the first access node meets the first loading criteria when the loading of the first access node meets a loading threshold.

13. The method of claim 7, further comprising:
transmitting an access node sector identifier and an access node group identifier which is based on the access node sector identifier from the first access node; and
receiving at the second access node the access request to initiate a communication session between a wireless device and the second access node when the access node sector identifier and the access node group identifier from the first access node indicate a physical access node identifier of the first access node,
wherein the determination that the first access node loading information meets the first loading criteria is based on the physical access node identifier of the first access node.

14. A system for managing initial cell selection in a wireless communication network, comprising:
a processing node with a processor configured to:
transmit synchronization information and access node identification information from a first access node and a second access node;
determine that loading information of the first access node meets a first loading criteria and loading information of the second access node meets a second loading criteria;
transmit a message from the first access node comprising the determination that the loading information of the first access node meets the first loading criteria and the loading information of the second access node meets the second loading criteria; and
receive an access request to initiate a communication session between a wireless device and the second access node based on the message and a determination that the first access node comprises a highest cross-correlation and that the second access node comprises a next-highest cross-correlation, wherein the access node identification for each of the first access node and second access node is used to extract references sequences from the synchronization information such that the highest cross-correlation and next highest cross-correlation are determined based on the extracted references sequences.

15. The system of claim 14, wherein the processing node is further configured to transmit a message from the first access node prior to the receipt of an access request from a wireless device comprising the determination that the loading information of the first access node meets the first loading criteria and the loading information of the second access node meets the second loading criteria, wherein the loading information of the second access node is shared with first access node.

16. The system of claim 14, wherein the processing node is further configured to determine at a first time that the loading information of the first access node meets a first loading criteria and the loading information of the second access node meets a second loading criteria.

17. The system of claim 16, wherein the processing node is further configured to:
determine at a second time that the loading information of the second access node meets the first loading criteria and that loading information of a third access node meets the second loading criteria;
update the message to include the determination that the loading information of the second access node meets the first loading criteria and that the loading information of a third access node meets the second criteria; and
transmit the updated message from at least one of the first access node, the second access node and the third access node.

18. The system of claim 14, wherein the processing node is further configured to:
transmit an access node sector identifier and an access node group identifier which is based on the access node sector identifier from the first access node; and
receive at the second access node the access request to initiate a communication session between a wireless device and the second access node when the access node sector identifier and the access node group identifier from the first access node indicate a physical access node identifier of the first access node,
wherein the determination that the first access node loading information meets the first loading criteria is based on the physical access node identifier of the first access node.

19. The method of claim 1, wherein the request to initiate a communication comprises an initial cell selection request.

20. The method of claim 1, wherein the loading information of the first access node meeting the first loading criteria indicates that the first access node would reject a request from the wireless device to initiate communication and the loading information of the second access node meeting the second loading criteria indicates that the second access node would not reject a request from the wireless device to initiate communication.

* * * * *